US009188478B2

(12) United States Patent
Pouet

(10) Patent No.: US 9,188,478 B2
(45) Date of Patent: Nov. 17, 2015

(54) MULTI-CHANNEL LASER INTERFEROMETRIC METHOD AND APPARATUS FOR DETECTION OF ULTRASONIC MOTION FROM A SURFACE

(71) Applicant: Bruno François Pouet, Los Angeles, CA (US)

(72) Inventor: Bruno François Pouet, Los Angeles, CA (US)

(73) Assignee: Bossa Nova Technologies, LLC, Culver City, CA (US)

(*) Notice: Subject to any disclaimer, the term of this patent is extended or adjusted under 35 U.S.C. 154(b) by 167 days.

(21) Appl. No.: 13/762,663

(22) Filed: Feb. 8, 2013

(65) Prior Publication Data

US 2013/0208284 A1 Aug. 15, 2013

Related U.S. Application Data

(60) Provisional application No. 61/597,058, filed on Feb. 9, 2012.

(51) Int. Cl.
*G01B 11/02* (2006.01)
*G01H 9/00* (2006.01)
(52) U.S. Cl.
CPC ............... *G01H 9/008* (2013.01); *G01H 9/006* (2013.01)

(58) Field of Classification Search
CPC ... G01H 9/008; G01H 9/02083; G01H 9/02095
USPC .......................................................... 356/502
See application file for complete search history.

(56) References Cited

U.S. PATENT DOCUMENTS

| 7,864,338 B2 * | 1/2011 | Pouet ............................ 356/502 |
| 8,144,334 B2 * | 3/2012 | Chinn et al. .................. 356/482 |
| 2009/0027688 A1 | 1/2009 | Pouet |
| 2009/0122322 A1 | 5/2009 | Pouet |

* cited by examiner

*Primary Examiner* — Jonathan Hansen
(74) *Attorney, Agent, or Firm* — Osha Liang LLP

(57) ABSTRACT

An apparatus and a method for detecting surface motion of an object subject to ultrasound are disclosed. The method comprises generating a laser beam, dividing the laser beam into a reference beam and an object beam to be directed onto the surface, thereby producing a scattered object beam, introducing a small-amplitude modulation in the optical path difference between the reference beam and the scattered object beam, detecting the interference between the scattered object beam and the phase modulated reference beam using a plurality of detecting elements to generate a plurality of electrical interference signals, wherein the electrical interference signals each comprise a wanted signal component indicative of the surface motion and a noise signal component, and processing the electrical interference signals to determine the surface motion of the object.

17 Claims, 10 Drawing Sheets

MULTI-CHANNEL LASER INTERFEROMETRIC METHOD AND APPARATUS FOR DETECTION OF ULTRASONIC MOTION FROM A SURFACE

CROSS-REFERENCE TO RELATED APPLICATIONS

This application claims benefit, under 35 U.S.C. §119, of U.S. Provisional Application Ser. No. 61/597,058, filed on Feb. 9, 2012. The disclosure of this U.S. Provisional Application is incorporated herein by reference in its entirety.

BACKGROUND OF INVENTION

1. Field of the Invention

The present invention relates generally to laser interferometric methods and apparatus for optical detection of small transient surface motion and particularly for detection of very small transient surface motion of an object subjected to ultrasound, independently of the optical surface quality.

2. Background Art

Interferometry is a well known technique for measuring the phase difference between two or more optical beams. Two-beam interferometers, where one of the optical beams is back reflected by an object surface and the other beam is used as a reference, are used to monitor small deformations on an object or workpiece under test or small displacements of a surface of an object or workpiece under test. Laser ultrasonics can advantageously be used for nondestructive testing in order to measure the thickness of objects or to monitor defects in materials. When industrial applications involve the inspection of an optically rough surface, the ultrasonic information is encoded in a laser beam with speckles.

For detection on optically rough surfaces, the optical sensor must be able to efficiently process the back reflected speckled light. Three different types of interferometers have been previously proposed and developed to efficiently process speckled light for detection of small transient ultrasonic signals: confocal Fabry-Perot interferometers (CFP), adaptive interferometers based on two-wave mixing in photorefractive crystals (TWM), and Multi-channel random-quadrature (MCRQ) interferometers.

With the CFP and TWM interferometers, processing the speckles is carried out optically, and a single photodetector is then used to detect the demodulated signal. With the recently developed MCRQ interferometer, as described in published U.S. patent application US20090027688, processing the multiple speckles is carried out electronically using an array of photodetectors instead of a single photodetector. Each detector element of the array is optimized for single-speckle detection. As shown in FIG. 1A, the MCRQ interferometer 10 comprises a laser source 12 that is adapted to generate a laser beam 14 of a given intensity. The laser beam 14 is split into an object beam 16 and a reference beam 18 using a first beam splitter 20. The object beam 16 is then directed onto a scattering surface of an object 24 subjected to ultrasound using an optical lens 26. The back-scattered light 28 is collected by the lens 26, thus generating a scattered object beam 30. The reference beam 18 is expanded by means of a beam expander 32, and directed by means of mirrors 31, 35. The reference beam 18 and the scattered object beam 30 are then combined using a second beam splitter 33, thus forming two interference beams 34, 36. The two interference beams 34, 36 are each received by two detector arrays 38, 39 of photodetector elements $38_i$, $39_i$, respectively, and converted into electrical interference signals, which are processed by a parallel processing circuit 40.

The phases of the portions of the interference beam arriving at the detector elements are random and not correlated with each other due to the speckled interference beam that results from a rough surface of the object whose displacement is measured. Thus, every detector of the detector array 38, 39 receives another speckle pattern with random and non-correlated phases. A processing circuit used with the MRCQ interferometer is also described in U.S. patent application US20090027688 and shown in FIG. 1B. The processing circuit is used to carry out electronic parallel signal processing based on signal rectification, i.e., on the rectification of the amplitude of a sinusoidal signal. The processing circuit is used to generate an output signal proportional to the rectified displacement of the workpiece surface.

However, it has been shown that for measurement values near or below the noise level, the rectification process does not effectively rectify the signals and the output amplitude is lower than the amplitude expected for a response proportional to the absolute value of displacement. Furthermore, for signals with ultrasonic frequencies of more than a few tens of MHz, demodulation based on signal rectification is no longer efficient. With increasing detection bandwidths, the noise amplitude also increases and the signal is often of smaller amplitude.

U.S. published patent application US 20090122322 describes a linear demodulation scheme exhibiting high sensitivity. Linear-demodulation is achieved by using a frequency shift or a Doppler shift in one of the interferometer arms and by synchronizing the detection to this applied frequency/Doppler shift. Practically, the frequency shift may be achieved by mounting a mirror on a piezo electrical translator and applying a ramp signal to the piezo translator, thereby displacing the mirror at a constant velocity for the duration of the ramp.

Although the above described linear detection has shown a good signal-to-noise ratio, it has shown to present some limitations. When using a piezo-mirror, the above described linear detection technique requires excitation with a ramp signal. The detection is thus not continuous because a reset in the ramp is needed. Furthermore, with the technique described in US20090122322, the Doppler frequency must be well below the frequency bandwidth of the ultrasonic signal in order to be efficiently filtered out and to get a clean ultrasonic signal.

A new scheme for linear demodulation is proposed to overcome the above mentioned limitations.

SUMMARY OF INVENTION

In a first aspect, the present disclosure relates to a method for detecting surface motion of an object subject to ultrasound. The method comprises generating a laser beam, dividing the laser beam into a reference beam and an object beam to be directed onto the surface, thereby producing a scattered object beam, introducing a small-amplitude modulation in the optical path difference between the reference beam and the scattered object beam, detecting the interference between the scattered object beam and the phase modulated reference beam using a plurality of detecting elements to generate a plurality of electrical interference signals, wherein the electrical interference signals each comprise a wanted signal component indicative of the surface motion and a noise signal component, and processing the electrical interference signals to determine the surface motion of the object.

A small-amplitude modulation is defined in the present description as a modulation having an amplitude small compared to the optical wavelength of the laser beam, typically less than λ/10 where λ is the optical wavelength.

In a second aspect, the present disclosure relates to a multi-channel laser interferometric apparatus for detecting surface motion of an object subject to ultrasound. The apparatus comprises a laser source for producing a laser beam, a beam splitter for dividing the laser beam into a reference beam and an object beam to be directed onto the surface, thereby producing a scattered object beam, a phase modulating element for introducing a small-amplitude modulation in the optical path difference between the reference beam and the scattered object beam, a detector with a plurality of detector elements for detecting the interference between the scattered object beam and the reference beam, resulting in a plurality of electrical interference signals each comprising a wanted signal component indicative of the surface motion and a noise signal component and a processing unit for determining the surface motion of the object from the plurality of electrical interference signals.

Other aspects, characteristics, and advantages of the invention will be apparent from the following detailed description.

DETAILED DESCRIPTION

Figure 1A:
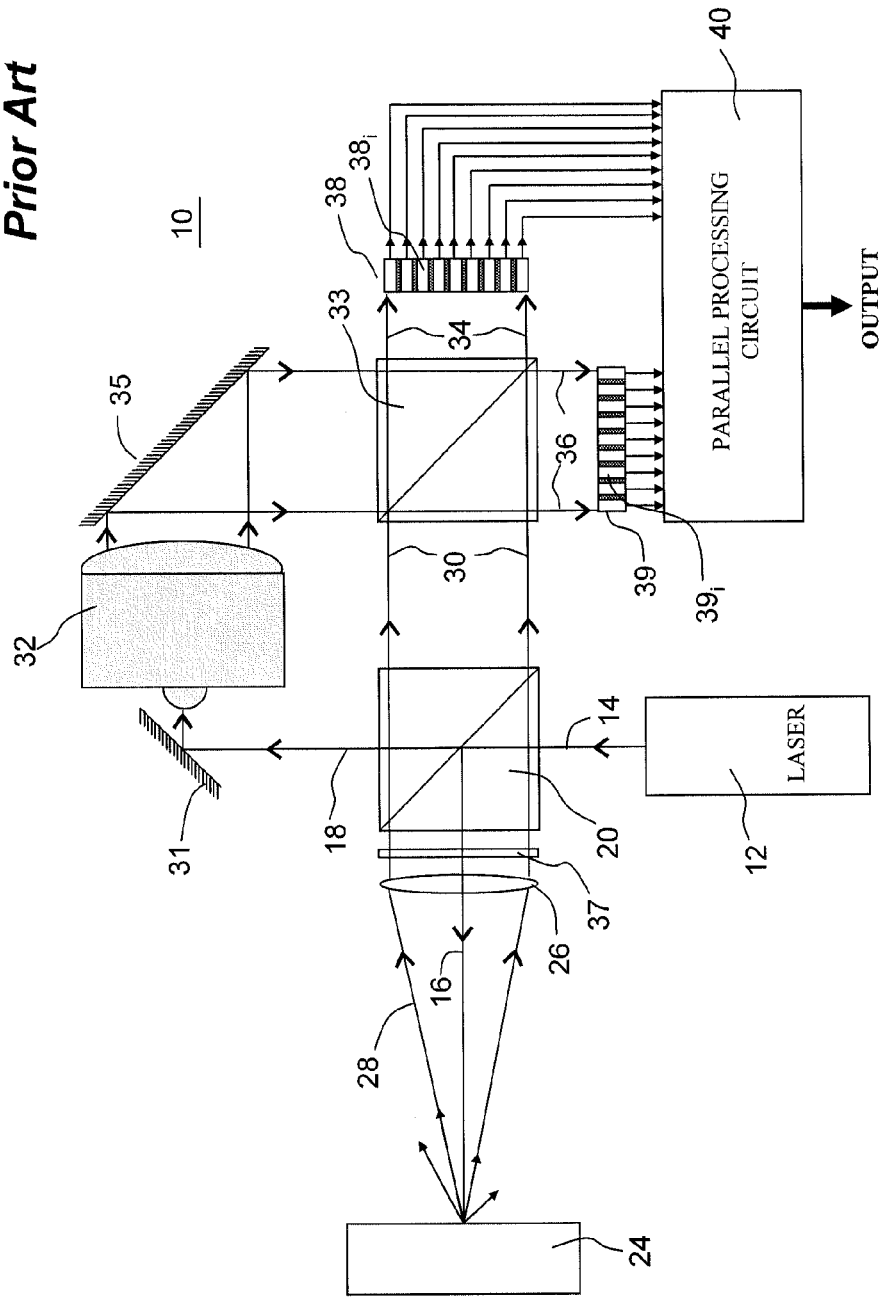
FIGS. 1A and 1B show a prior art multi-channel laser interferometer and a prior art processing circuit, respectfully.
Figure 1B:
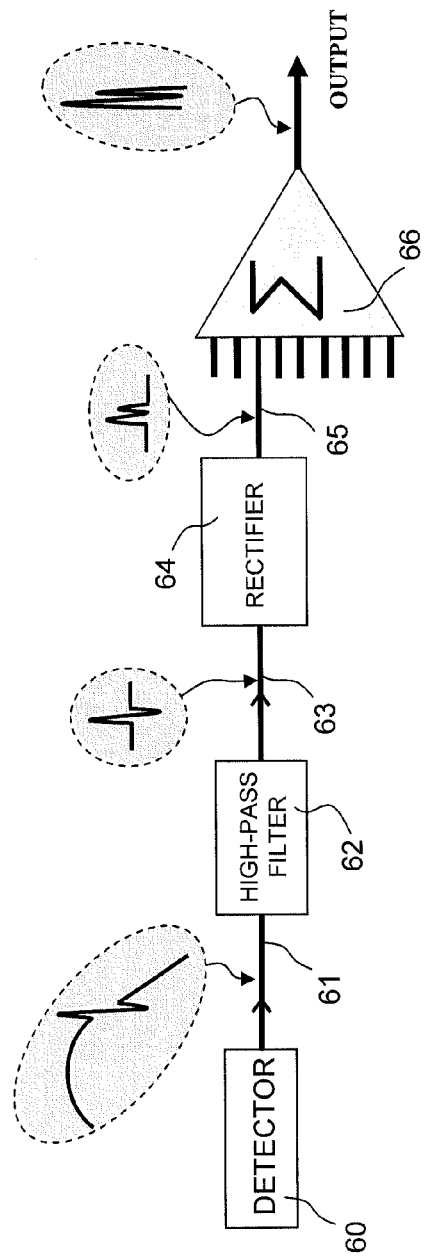

Specific embodiments of the present disclosure will now be described in detail with reference to the accompanying Figures. Like elements in the various Figures are denoted by like reference numerals for consistency.

In general, embodiments of the present disclosure relate to apparatus and methods for detecting very small surface motion of an object subject to ultrasound. More specifically, embodiments of the present disclosure provide methods and apparatus for obtaining output signals from a multi-speckle random-quadrature (MRCQ) interferometer that are proportional to the small transient surface motion.

We will describe methods and apparatus for detection of very small signals in interferometers enabling linear signal demodulation. This is achieved by using a small-amplitude phase modulation in one of the interferometer arms and by synchronizing the detection to this phase modulation.

Figure 2A:
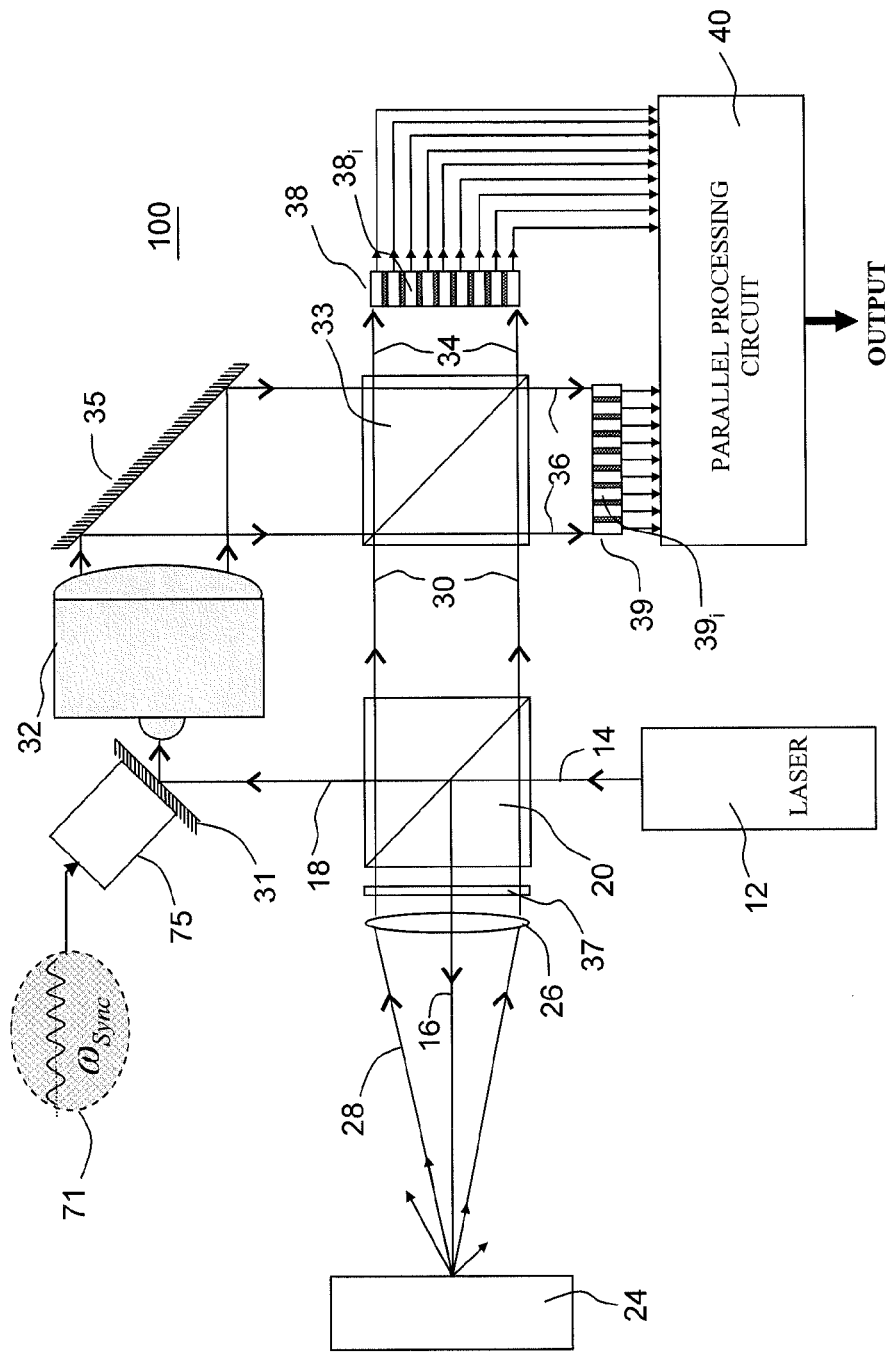
FIGS. 2A and 2B show variants of an interferometric apparatus according to a first embodiment disclosed herein.

FIG. 2A shows an interferometric apparatus 100 according to a first embodiment of the present disclosure. The optical setup of this embodiment presents elements that are similar to the ones shown in FIG. 1A. For the sake of conciseness, these elements are not described in detail again.

According to this embodiment, a small-amplitude phase modulation of frequency $\omega_{sync}$ is introduced into the reference beam 18 by mounting the mirror 31 on a piezo translator 75. A sinusoidal signal 71 is applied to the piezo translator 75, thereby generating small sinusoidal displacement of the mirror 31. This results in a small-amplitude modulation in the optical path difference between the reference beam 18 and the scattered object beam 28. Preferably, the resulting phase change at $\omega_{sync}$ is very small compared to the optical wavelength of the laser source 12. Further, the frequency $\omega_{sync}$ the small-amplitude modulation is selected to be outside the frequency bandwidth of the small ultrasonic displacement to be measured and above perturbations due to ambient noise. Ambient noise frequencies are typically smaller than around 100 kHz. For example, the ultrasonic frequency may be between 1 MHz and 10 MHz. Generally, the frequency $\omega_{sync}$ will be below or above the frequency bandwidth of interest.

Figure 2B:
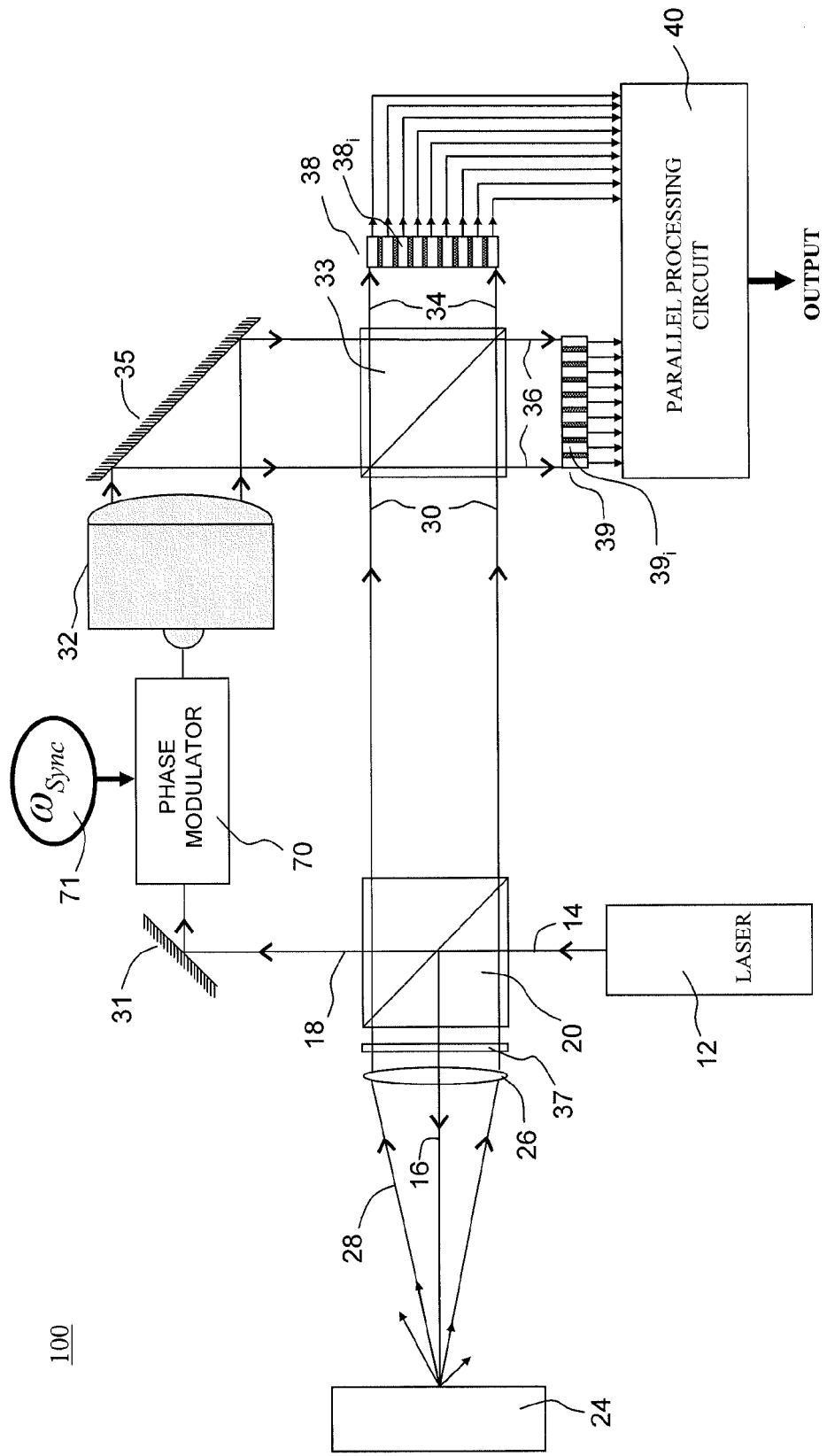

FIG. 2B shows a variant of the first embodiment shown in FIG. 2A. Here, direct phase modulation 71 of frequency $\omega_{sync}$ of the reference beam 18 is achieved by a phase modulator 70. Examples of phase modulators include, but are not limited to, electro-optic modulators.

According to another variant of the first embodiment, the first beam splitter 20 is a polarizing beam splitter, dividing the laser beam 14 into two orthogonally linearly polarized object and reference beams 16, 18. A quarter-wave plate 37, as shown in FIGS. 2A and 2B, is disposed between the polarizing beam splitter 20 and the lens 26, the quarter-wave plate 37 having its optical axis oriented at 45° to the polarization axis of the object beam 16. Then, the scattered object beam 30, when incident on the polarizing beam splitter 20, has a linear or slightly elliptical polarization whose axis is orthogonal to that of the object beam reflected from the polarizing beam splitter 20. The linearly polarized scattered object beam 30 will mostly propagate straight through the polarizing beam splitter 20, and only a small part of the scattered object beam 30 will be reflected back to the laser source 12.

Figure 3:
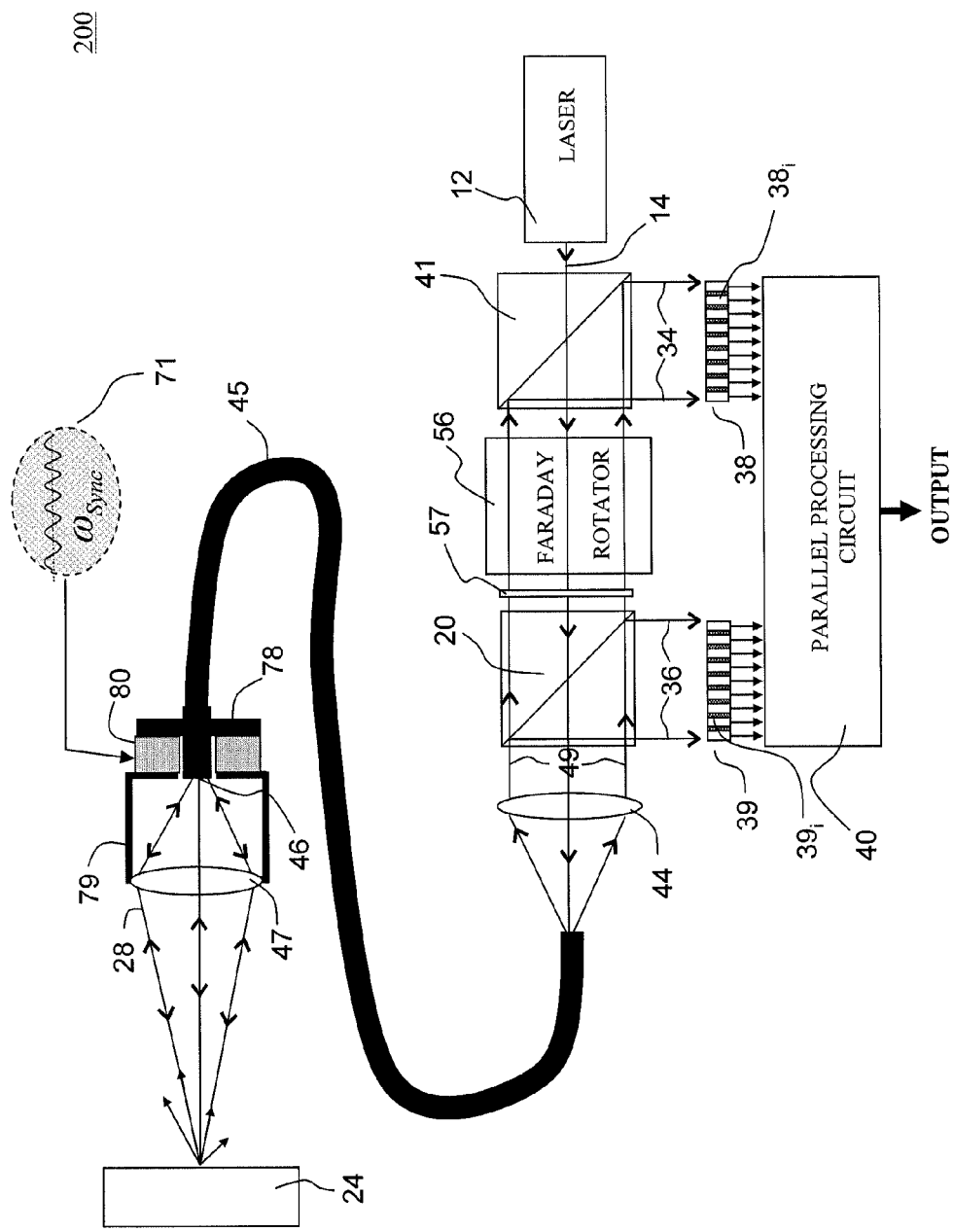
FIG. 3 shows an interferometric apparatus according to a second embodiment disclosed herein.

FIG. 3 shows the interferometric apparatus 200 according to a further embodiment of the present disclosure. In this embodiment, the object beam is phase modulated at the reference frequency $\omega_{sync}$. The apparatus 200 comprises a multimode fiber 45 to deliver the laser beam 14 onto the object 24. A large aperture lens 44 is used to couple the laser beam 14 into the multi-mode fiber 45. The multimode fiber end 46 is attached to one side of a piezo cylinder 80 using a fiber connector 78. The other side of the piezo cylinder 80 is attached to optical assembly 79. The optical assembly 79 comprises a lens 47. By applying an electrical signal to the piezo cylinder 80, the cylinder length varies, resulting in variation of the object path between the lens 47 and the fiber end 46. Similarly to the variant of the first embodiment shown in FIG. 2A, applying a sinusoidal signal 71 to the piezo cylinder 80 induces a sinusoidal displacement of the fiber end 46. This results in a phase modulation of the laser beam exiting the fiber end 46, i.e., the object beam. The phase modulated object beam is focused by means of the lens 47 onto the surface of the object 24. The scattered object beam 28 is then focused back into the multi-mode fiber 45.

A fraction of the laser beam is also back reflected by the partially reflective fiber end 46, thereby generating a reference beam. The reference beam and the object beam are combined during the back propagation in the multi-mode optical fiber 45 for generating an optical interference signal 49. The optical interference signal 49 exiting the optical fiber is then detected by the array of detectors 39; for example, the optical interference signal is focused by means of the lens 44 onto the array of detectors 39. The portions of the interference beam received by elements 39, of the detector array 39 are converted into electrical interference signals, which are processed by parallel processing circuitry 40.

As the person skilled in the art will appreciate, other systems than the piezo cylinder 80 attached to the fiber end 46 to induce motion of the fiber end 46 may be implemented with the interferometric apparatus 200 according to embodiments disclosed herein. For example, a voice coil system may be used to induce back and forth motion of the fiber end 46 with respect to the object 24. A mirror mounted on a piezo translator, similar to first embodiment 2A, may also be used in the object path to induce modulation in the optical path.

Still referring to FIG. 3, the interferometer apparatus may include a first and second array of detectors 39, 38, making use of all the light available. The laser beam 14 passes through a polarizing beam splitter 41, a Faraday rotator 56, and a half-wave plate 57, which is used to keep the polarization of laser beam 14 horizontal, and then passes through a second polarizing beam splitter 20. The large aperture lens 44 is used to couple the laser beam 14 into the multi-mode fiber 45. The vertically polarized component of the optical interference signal 49 exiting the multi-mode optical fiber 45 is then reflected by the second polarizing beam splitter 20 onto the first array of detectors 39. The horizontally polarized component of the optical interference signal 49 passes back through half-wave plate 57 and the Faraday rotator 56. The polarization of the horizontally polarized component of the optical interference signal 49 is thus rotated to vertical polarization, and the component is reflected by the polarizing beam splitter 41 onto the second array of detectors 38.

The Faraday rotator 56 and the polarizing beam splitter 41 form an optical isolator, which offers protection for the laser and thus avoids any possible laser instability caused by laser light being back-reflected into the laser. The Faraday rotator 56 also maximizes the sensitivity of the apparatus by allowing to separate and to independently detect the horizontal and the vertical polarization components of the optical interference signal 49, which exhibits scrambled polarization.

As will be understood by the skilled person, in the interferometric apparatus of FIGS. 2A, 2B and 3 according to embodiments disclosed herein, only one of the interference beams 34, 36 could be used. Thus, only one of the arrays of detectors 38, 39 would be necessary. However, it is advantageous to use the two interference beams 34, 36 in order to increase the sensitivity and the efficiency of the interferometric apparatus 10. In variants of the present disclosure, the two interference beams 34, 36 are used. In other variants, one of the interference beams 34, 36 is blocked, and only one interference beam is used.

Figure 4:
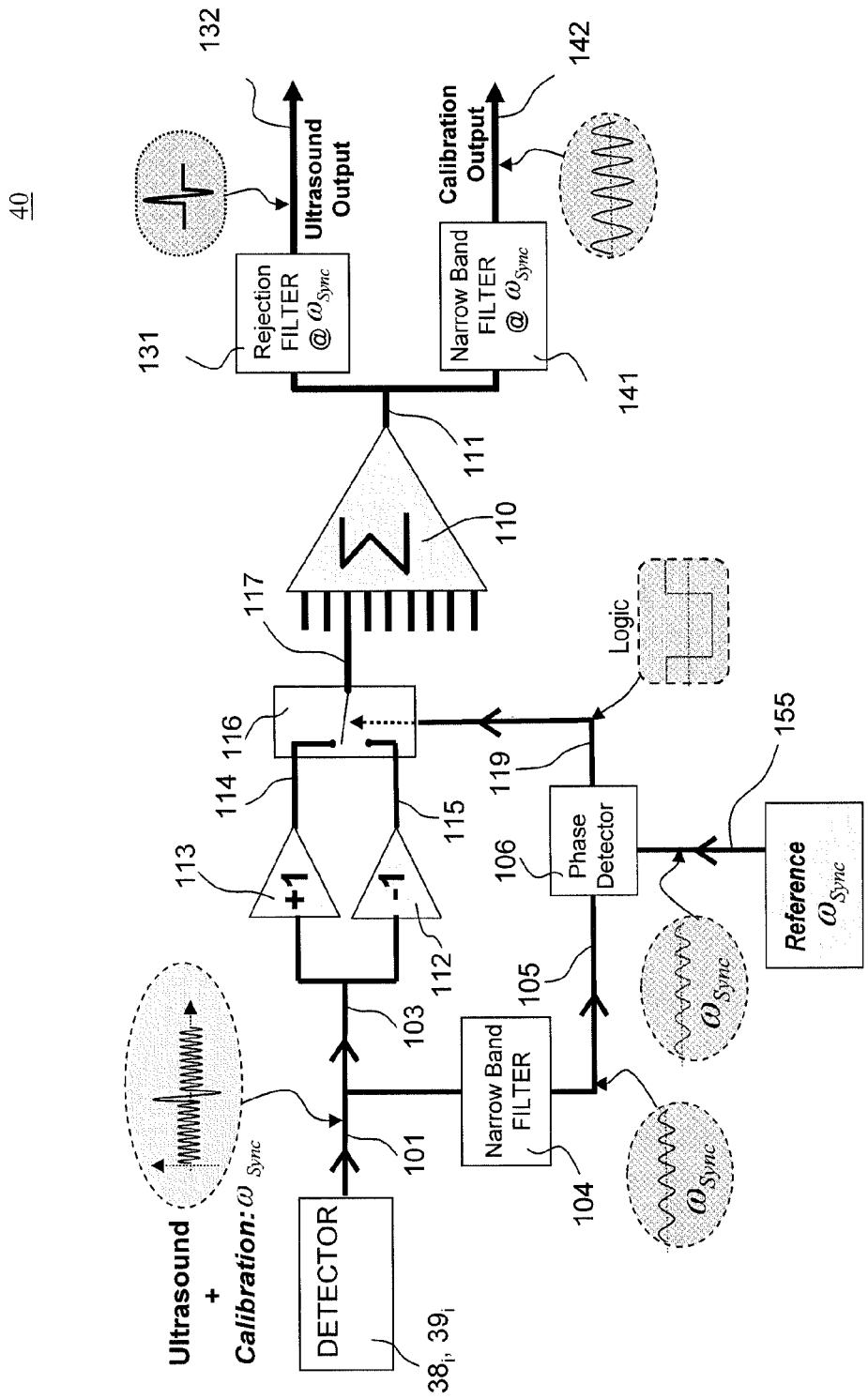
FIGS. 4 and 5 show processing circuits for interferometric apparatus according to embodiments disclosed herein.
Figure 5:
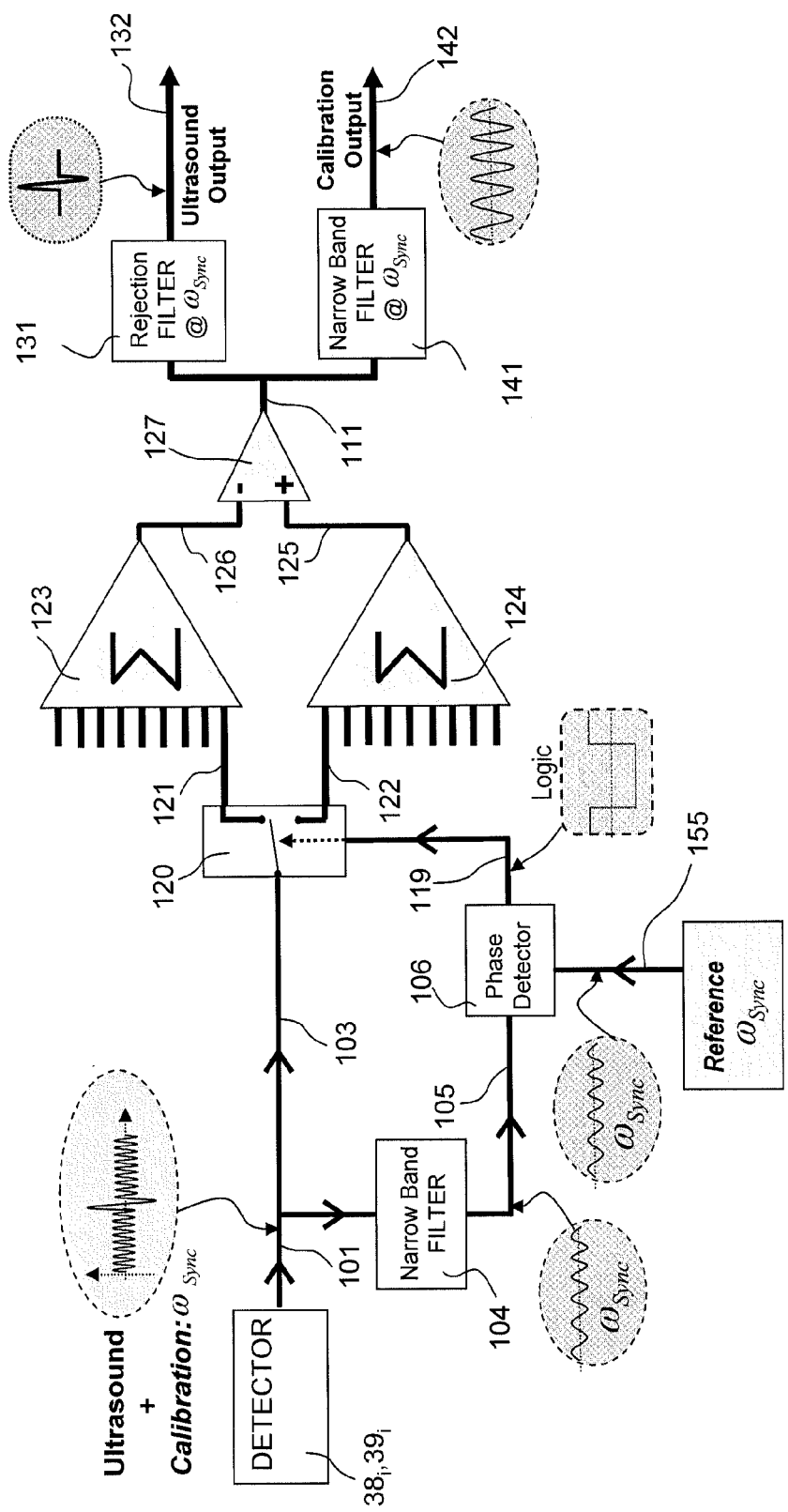

Referring now to FIGS. 4 and 5, two embodiments of the processing circuit 40 according to the present disclosure are shown. The processing circuit 40 according to embodiments disclosed herein is adapted for linear demodulation of electrical interference signals provided by the detector arrays of the interferometer apparatus. As such, the processing circuit 40 is adapted for generating a strong linear displacement signal by electronically correcting the sign of the interferometer transfer function. The sign correction of the transfer function is achieved by "lock-in" on the small-amplitude phase modulation frequency $\omega_{sync}$ introduced into the interference signal according to the embodiments of the interferometric apparatus described in FIGS. 2A, 2B, and 3. In FIGS. 4, and 5, the processing scheme for only one detection channel is shown, i.e., for one electrical interference signal 101 originating from one detector element $38_i$, $39_i$, of the detector array 38, 39.

FIG. 4 illustrates the processing circuit 40 according to a first embodiment of the present disclosure, in which the sign correction is performed with digital circuitry. The electrical interference signal 101 is split in two signals: a first electrical signal 103 or ultrasonic electrical signal, sent in a signal path, and a second electrical signal 105 or synchronization electrical signal, sent in a synchronization path. The ultrasonic signal 103 is further separated in two signals: a direct electrical signal 114 and an inverted electrical signal 115 using amplifiers 112, 113. The synchronization signal 105 of frequency $\omega_{sync}$ is compared to a reference electrical signal 155 also of frequency $\omega_{sync}$. It may be previously filtered using a narrow band filter 104 centered on the frequency $\omega_{sync}$. A phase comparator 106 outputs a logic electrical signal 119 indicating of the phase difference. The output of the phase comparator depends on whether the synchronization signal is in-phase [0 deg] or out-of-phase [180 deg] compared to the reference electrical signal. The resulting logic signal 119 controls a multiplexer 116, selecting between the direct signal 114 and the inverted signal 115. The multiplexed signal 117 and the other multiplexed signals originating from the other channels then enter a summing amplifier 110, where they are added to produce an average output signal 111 that is indicative of the displacement of the surface of the object and the induced optical path modulation at frequency $\omega_{sync}$. A narrow band filter 141 and a rejection filter 131 enable to get respectively a calibration output 142 and an ultrasound output 132 corresponding to the wanted signal. The calibration output 142 may be used to normalize the amplitude of the ultrasound output and also to calibrate the set-up.

FIG. 5 shows a variant of the first embodiment of the processing circuit shown in FIG. 4. The logic signal 119 controls a switch 120, which roots the ultrasonic electrical signal 103 toward an inverting path 121 or a non-inverting path 122. All the ultrasonic electrical signals from the negative path 121 are summed by a first summing amplifier 123, thereby producing a first output signal 126. The first output signal 126 is then sent to the inverting input of an output differential amplifier 127. All the ultrasonic electrical signals from the positive path 122 are summed by a second summing amplifier 124, thereby producing a second output signal 125. The second output signal 125 is then sent to the summing input of the output differential amplifier 127. The first and second output signals 126, 125 are then subtracted from each other by the output differential amplifier, thereby producing an average output signal 111 that is indicative of the displacement of the surface of the object.

Figure 6:
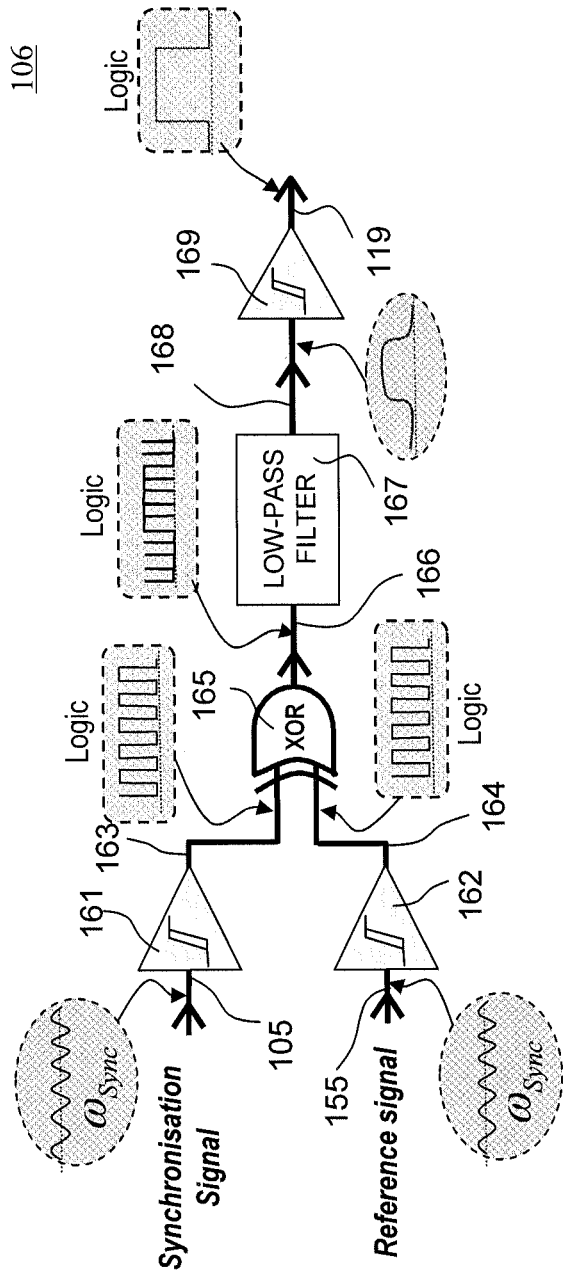
FIG. 6 shows a circuit for phase detection in a processing circuit according to an embodiment disclosed herein.

FIG. 6 shows an exemplary embodiment of a phase comparator 106. The analog input signals 105 (synchronization electrical signal) and 106 (reference electrical signal) are converted to digital signals with the use of the comparators 161 and 162. A two-level phase comparator is implemented using a standard logic circuit, an Exclusive-OR (XOR) 165. The output 166 of the exclusive-OR is at a logic HIGH if the two inputs 163 and 164 are at the different logic level (inputs are out-of phase). The output 166 of the exclusive-OR is at a logic LOW if the two inputs are at the same logic level (inputs are in-phase). The logic signal 166 is then clean-up using a low pass filter, to remove glitches (short pulse duration). The comparator 169 is then used to convert the low-pass filtered signal 168 to a digital signal 119.

The electrical interference signal from a detector element n of a detector array may be written as:

$$V_D(n) \propto I_{ref} + 2\sqrt{I_{obj(n)}I_{ref}} \cos[\phi_{LF}(t,n) + \phi_{Sync}\sin(\omega_{Sync}t) + \phi_{UT}(t)] \quad (1)$$

where $\phi_{Sync}\sin(\omega_{Sync}t)$ is the applied small-amplitude phase modulation, $\phi_{UT}(t)$ is the small-amplitude and high-frequency phase variation induced by ultrasound, and $\phi_{LF}(t)$ is the low frequency component of the phase (including the random speckle phase distribution and dependent on ambient noise), which fluctuates between 0 and $2\pi$. The amplitude $\phi_{Sync}$ of the small-amplitude phase modulation $\phi_{Sync} \sin(\omega_{Sync} t)$ is small compared to the optical wavelength $\lambda$ of the laser source 12, i.e. smaller than $\lambda/10$, for example around or smaller than $\lambda/100$. $I_{obj(n)}$ and $I_{ref}$ correspond to the intensities of the scattered object beam and the reference beam, respectively. It is assumed that the reference intensity is uniform on the detector array and much stronger than the scattered object intensity.

Figure 7:
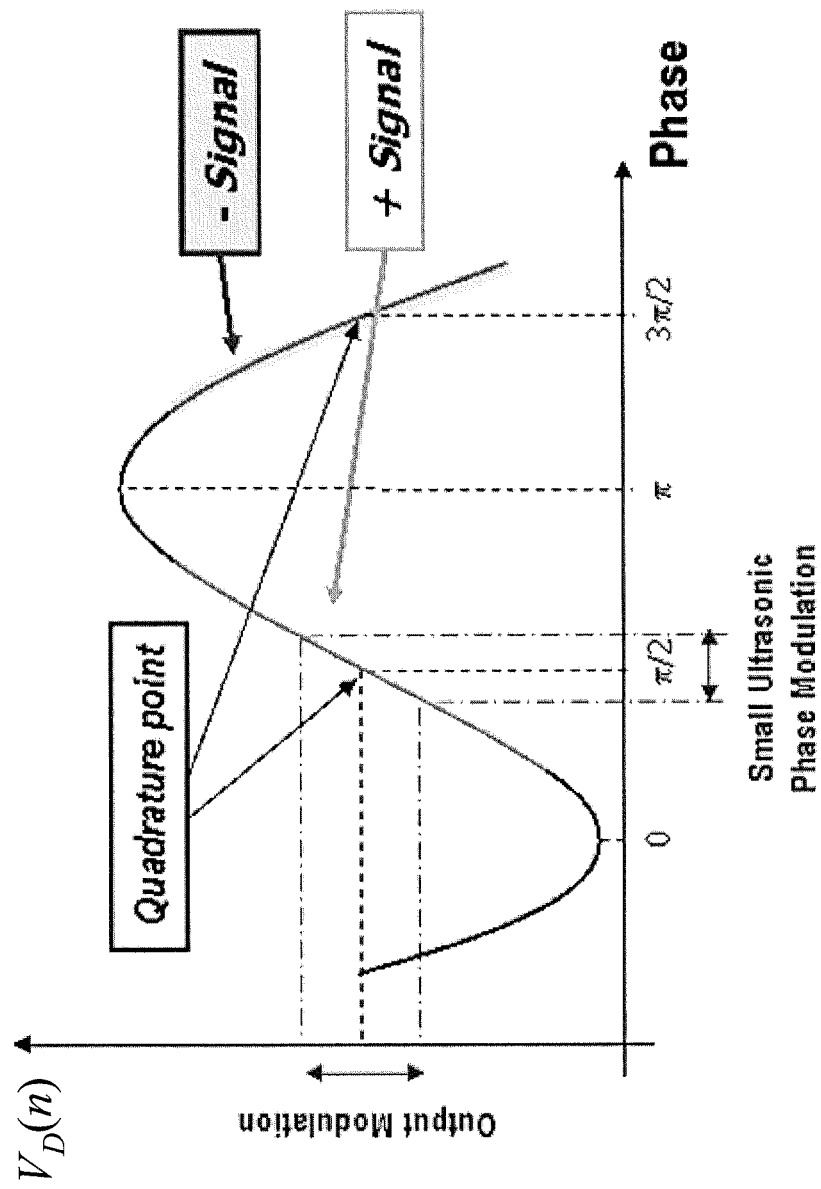
FIG. 7 schematically shows an example of an electrical interference signal (transfer function) of the interferometric apparatus according to embodiments disclosed herein.

A sign ambiguity is due to the transfer function of the interferometric apparatus, i.e., the electrical interference signal $V_D(n)$. As shown in FIG. 7, depending on the phase $\phi_{LF}(t, n)$, the transfer function can be assumed to be linear with either a positive ($\phi_{LF}(t, n) \approx \pi/2$, "+ signal") or a negative slope ($\phi_{LF}(t,n) \approx 3\pi/2$, "− signal"), which leads to the sign ambiguity. In the linear ranges, the interferometric apparatus is said to operate in-quadrature, and the sensitivity of the apparatus with respect to the ultrasonic phase modulation is optimized. Otherwise, the interferometric apparatus operates out-of-quadrature ($\phi_{LF}(t,n) \approx 0$ or $\phi_{LF}(t,n) \approx \pi$), and the sensitivity of the apparatus is near zero. As explained below, the sign ambiguity may be removed by considering the detected signal at $\omega_{sync}$ and comparing its phase to a reference signal (155, FIGS. 4, 5) also at $\omega_{sync}$.

As explained above, for each detection channel, the detected interference signal is split into an ultrasonic electrical signal rooted to a signal path and a synchronization electrical signal rooted to a synchronization path. In the synchronization path, we only look at the signal at the synchronization frequency $\omega_{Sync}$. Assuming that both the synchronization electrical signal at $\omega_{Sync}$ and the ultrasonic electrical signal are of small amplitude compared to the wavelength, the amplitude of the synchronization electrical signal ($V^n_{Synchro}$) and the ultrasonic electrical signal ($V^n_{Signal}$) are given by:

$$V_{Synchro}^n \propto -2\sqrt{I_{Ref}^n I_{Obj}^n} \cdot \text{Sin} [\phi_{LF}^n(t) + \phi_{UT}(t)] \cdot \phi_{Sync} \sin(\omega_{Sync} t) \quad (2)$$

$$V_{Signal}^n \propto -2\sqrt{I_{Ref}^n I_{Obj}^n} \cdot \text{Sin} [\phi_{LF}^n(t) + \phi_{Sync} \sin(\omega_{Sync} t)] \cdot \phi_{UT}(t) \quad (3)$$

When the interferometer operates in its sensitive zone, corresponding to $\phi_{LF}^n$ around $\pm \pi/2$, the ultrasonic and synchronization signals are affected similarly by the speckle phase, $\text{Sin} [\phi_{LF}^n(t)]$. Because $\phi_{Sync}$ and $\phi_{UT}$ are small, the synchronization electrical signal ($V^n_{Synchro}$) and the ultrasonic electrical signal ($V^n_{Signal}$) are reduced to:

$$V_{Synchro}^n \propto -2\sqrt{I_{Ref}^n I_{Obj}^n} \cdot \text{Sin} [\phi_{LF}^n(t)] \cdot \phi_{Sync} \sin(\omega_{Sync} t) \quad (4)$$

$$V_{Synchro}^n \propto -2\sqrt{I_{Ref}^n I_{Obj}^n} \cdot \text{Sin} [\phi_{LF}^n(t)] \cdot \phi_{UT}(t) \quad (5)$$

In the synchronization path, a phase detector (106, FIGS. 4 and 5) locked-in on the synchronization frequency is implemented using an exclusive-OR-gate. When the reference and the synchronization signals are in phase, the gate output is at a low level. When the two signals have opposite phase, the gate output is high. The gate output is then used to control the analog switch in the ultrasonic signal path and to select either a gain of +1 or −1 for the ultrasonic signal. After polarity correction and summation, the output signal becomes:

$$V_{Out} \propto \varphi_{UT}(t) \cdot 2 \sum_n \sqrt{I_{Ref}^n I_{Obj}^n} \cdot |\text{Sin}[\phi_{LF}^n(t)]|. \quad (6)$$

Figure 8:
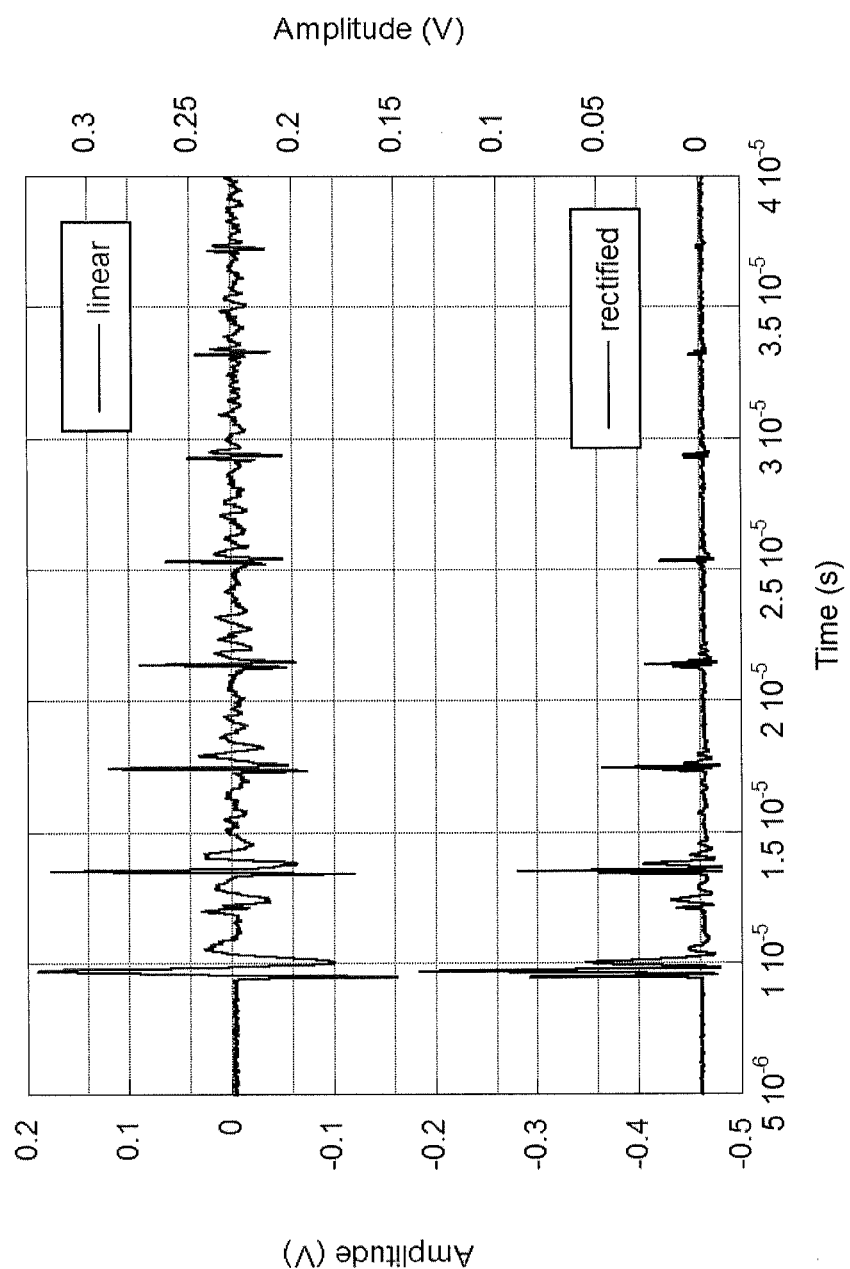
FIG. 8 shows a processed output signal corresponding to an object's surface displacement.

Similarly to the demodulation by rectification for large number of elements, the summation of $|\sin(\phi_{LF}^n)|$ averages out to $2/\pi$. The output signal is now proportional to the small ultrasonic phase of interest. FIG. 8 shows an example of small ultrasonic signals from surface motion detected and processed with an interferometric apparatus and a linear demodulation scheme according to embodiments disclosed herein (upper trace) compared to an output signal resulting from the previous art demodulation based on signal rectification (lower trace). Two detector arrays were used, each comprising 25 detector elements. The two signals correspond to the same ultrasonic surface displacement. As it can be seen in FIG. 8, the linear demodulation shows more information: the displacement direction (positive or negative values of the output signal are significant of the direction), lost with the rectified demodulation, is now apparent with the linear demodulation and the very small displacement between two main peaks are now visible with the linear demodulation.

Advantageously, apparatus and methods of the present disclosure may provide at least one of the following advantages.

The linear detection scheme according to embodiments disclosed herein exhibits near ideal sensitivity. Very small signals may be detected, whereby the signals are proportional to the surface motion of the object. The linear detection scheme also provides for the knowledge of the direction of the surface displacement, and it is adapted to be used with a large range of ultrasonic frequencies.

Embodiments disclosed herein allows for continuous detection. The low-amplitude phase modulation may be simply achieved with a mirror mounted on a very low amplitude vibrating element: vibration amplitude needed is only of few nanometers (small compared to optical wavelength, typically 532 nm). The induced small amplitude modulation has low influence on the ultrasonic signal. The small signal amplitude leads to low harmonic distortion.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting surface motion of an object subject to ultrasound, comprising:
   generating a laser beam;
   dividing the laser beam into a reference beam and an object beam to be directed onto the surface, thereby producing a scattered object beam;
   introducing a small-amplitude modulation in the optical path difference between the reference beam and the scattered object beam;
   detecting the interference between the scattered object beam and the reference beam using a plurality of detecting elements to generate a plurality of electrical interference signals, wherein the electrical interference signals each comprise a wanted signal component indicative of the surface motion and a noise signal component; and
   processing the electrical interference signals to determine the surface motion of the object, wherein the processing comprises:
      separating each of the electrical interference signals into a first electrical signal and a second electrical signal;
      performing synchronous detection between each second electrical signal and a reference electrical signal at the frequency of the small-amplitude modulation, to determine whether the electrical interference signal is in-phase or out-of-phase with the reference electrical signal; and processing the first electrical signals as function of the results of the synchronous detections to obtain an output signal comprising the wanted signal component.

2. The method according to claim 1, wherein the frequency of the small-amplitude modulation is selected to be outside a frequency bandwidth of interest of surface motion of the object.

3. The method according to claim 1, comprising:
band-pass filtering each second signal using a band-pass filter centered on the frequency of the small-amplitude modulation.

4. The method according to claim 1, wherein processing the first electrical signals comprises:
converting for each second electrical signal the output of the synchronous detection to a binary logic signal;
rooting the corresponding first electrical signal toward either a in-phase summing path or an out-of-phase summing path using the binary logic signal;
summing the first electrical signals rooted to the in-phase summing phase to obtain a first output signal and summing the first electrical signals rooted to the out-of-phase summing phase to obtain a second output signal;
subtracting the first and the second output signal to obtain an output signal comprising the wanted signal component.

5. The method according to claim 1, wherein processing the first electrical signals comprises:
separating each first electrical signal into a direct electrical signal and an inverted electrical signal;
converting for each second electrical signal the output of the synchronous detection to a binary logic signal;
selecting the direct electrical signal or the inverted electrical signal using the binary logic signal to obtain an in-phase first electrical signal;
summing the in-phase first electrical signals to obtain an output signal comprising the wanted signal component.

6. The method according to claim 1, further comprising:
obtaining the wanted signal component by filtering out the calibration signal from the output signal.

7. The method according to claim 1, further comprising:
obtaining a calibration signal component by band-pass filtering the output signal.

8. A multi-channel laser interferometric apparatus for detecting surface motion of an object subject to ultrasound, comprising:
a laser source for producing a laser beam;
a beam splitter for dividing the laser beam into a reference beam and an object beam to be directed onto the surface, thereby producing a scattered object beam;
a phase modulating element for introducing a small-amplitude modulation in the optical path difference between the reference beam and the scattered object beam;
a detector with a plurality of detector elements for detecting the interference between the scattered object beam and the reference beam, resulting in a plurality of electrical interference signals each comprising a wanted signal component indicative of the surface motion and a noise signal component; and
a processing unit for determining the surface motion of the object from the plurality of electrical interference signals,
wherein the processing unit comprises:
for each detector element, a signal path and a synchronization path adapted to receive respectively a first electrical signal and a second electrical signal originated from the electrical interference signal; and
in the synchronization path, a phase detector locked in on the frequency of the small-amplitude modulation adapted to output a binary logic signal.

9. The apparatus according to claim 8, further comprising a beam combiner for generating the interference between the scattered object beam and the reference beam on the detector.

10. The apparatus according to claim 9, further comprising a second detector with a plurality of detector elements, wherein the beam combiner generates the interference between the scattered object beam and the reference beam on each of the detectors.

11. The apparatus according to claim 8, further comprising a multimode optical fiber into which the laser beam is coupled, wherein the beam splitter comprises an end facet of the multimode optical fiber and the interference between the scattered object beam and the reference beam is generated within the fiber.

12. The apparatus according to claim 8, wherein the processing unit further comprises:
a switch for rooting each first electrical signal toward either an in-phase summing path or an out-of-phase summing path using the binary logic signal;
a first summing amplifier for summing the first electrical signals rooted to the in-phase summing phase to obtain a first output signal and a second summing amplifier for summing the first electrical signals rooted to the out-of-phase summing phase to obtain a second output signal;
a differential amplifier for subtracting the first and the second output signal to obtain an output signal comprising the wanted signal component.

13. The apparatus according to claim 8, wherein the processing unit further comprises:
in the signal path, separating means for separating each first electrical signal into a direct electrical signal and an inverted electrical signal and a switch for selecting between the direct electrical signal and the inverted electrical signal using the binary logic signal;
a summing amplifier for summing the selected signals.

14. The apparatus according to claim 8, wherein the phase modulating element comprises an electro-optic modulator disposed in the reference beam.

15. The apparatus according to claim 8, wherein the phase modulating element comprises a piezo mirror disposed in the reference beam.

16. The apparatus according to claim 11, wherein the phase modulating element comprises a piezo cylinder attached to an end of the multimode optical fiber.

17. The apparatus according to claim 11, wherein the phase modulating element comprises a piezo mirror disposed in the object beam, at the exit of the multimode optical fiber.

* * * * *